(12) United States Patent
Ji et al.

(10) Patent No.: US 11,025,441 B2
(45) Date of Patent: Jun. 1, 2021

(54) POWER SUPPLY

(71) Applicant: NEW H3C TECHNOLOGIES CO., LTD., Hangzhou (CN)

(72) Inventors: Zhe Ji, Beijing (CN); Baotao Ning, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 45 days.

(21) Appl. No.: 16/462,275

(22) PCT Filed: Nov. 24, 2017

(86) PCT No.: PCT/CN2017/112797
§ 371 (c)(1),
(2) Date: May 20, 2019

(87) PCT Pub. No.: WO2018/095399
PCT Pub. Date: May 31, 2018

(65) Prior Publication Data
US 2019/0356497 A1 Nov. 21, 2019

(30) Foreign Application Priority Data
Nov. 25, 2016 (CN) .......................... 201611067048.X

(51) Int. Cl.
*H04L 12/10* (2006.01)
(52) U.S. Cl.
CPC .................................... *H04L 12/10* (2013.01)
(58) Field of Classification Search
None
See application file for complete search history.

(56) References Cited

U.S. PATENT DOCUMENTS 7,705,741 B2 * 4/2010 Picard .................... G01R 31/58
340/652
2006/0112288 A1 5/2006 Schindler
(Continued)

FOREIGN PATENT DOCUMENTS

CN 105703618 6/1916
CN 205545309 8/1916
(Continued)

OTHER PUBLICATIONS

International Search Report and Written Opinion issued in Corresponding International Patent Application No. PCT/CN2017/112797, dated Jan. 4, 2018.
(Continued)

*Primary Examiner* — Idris N Alrobaye
*Assistant Examiner* — Dayton Lewis-Taylor
(74) *Attorney, Agent, or Firm* — Norton Rose Fulbright US LLP

(57) ABSTRACT

PSEs are provided. In one aspect, the PSE includes a first port group, a second port group, a second port group and a power sourcing module. The first port group includes a plurality of PSE ports, wherein the PSE ports in the first port group are connected in parallel and connected with a first line pair and a second line pair in the Ethernet cable. The second port group includes a plurality of PSE ports, wherein the PSE ports in the second port group are connected in parallel and connected with a third line pair and a fourth line pair in the Ethernet cable. The detecting and classifying module performs feature detection for a Power Device (PD) connected with the Ethernet cable. The power sourcing module outputs a working voltage from the first port group and outputs the working voltage from the second port group.

10 Claims, 2 Drawing Sheets

(56) References Cited

U.S. PATENT DOCUMENTS

| | | |
|---|---|---|
| 2007/0284946 A1 | 12/2007 | Robbins |
| 2010/0078992 A1 | 4/2010 | Landry et al. |
| 2013/0219195 A1 | 8/2013 | Picard |
| 2016/0064938 A1 | 3/2016 | Balasubramanian et al. |
| 2016/0080159 A1 | 3/2016 | Hunter, Jr. et al. |

FOREIGN PATENT DOCUMENTS

| | | |
|---|---|---|
| CN | 205647542 | 10/1916 |
| CN | 106130742 | 11/1916 |
| CN | 101147356 | 3/2008 |
| CN | 102177679 | 9/2011 |
| CN | 103873262 | 6/2014 |
| CN | 104243175 | 12/2014 |
| EP | 2933946 A1 | 10/2015 |
| JP | 2016082668 | 5/1916 |
| JP | 2008529459 | 7/2008 |
| JP | 2008529460 | 7/2008 |
| JP | 2008533918 | 8/2008 |
| JP | 2014090234 | 5/2014 |
| JP | 2015005286 | 1/2015 |
| JP | 2015204630 | 11/2015 |

OTHER PUBLICATIONS

Office Action issued in corresponding Chinese Patent Application No. 201611067048.X, dated Aug. 26, 2019 (English machine translation).

Extended Search Report issued in Corresponding European Patent Application No. 17874614.5 dated Aug. 8, 2019.

Darshan, Yair. "Analysis of usable PD input power in 4P system." IEEE802.3 4P Study Group, Jul. 2013, Geneva Switzerland, 26 pages.

Office Action issued in Corresponding Japanese Application No. 2019527381, dated Aug. 18, 2020 (No English translation provided).

\* cited by examiner

POWER SUPPLY

CROSS REFERENCE TO RELATED APPLICATIONS

This application is a national phase under 35 U.S.C. § 371 of International Application No. PCT/CN2017/112797, filed Nov. 24, 2017, which claims priority to Chinese Patent Application No. 201611067048.X entitled "POWER SOURCING EQUIPMENT" filed on Nov. 25, 2016, the entire contents of each of which are incorporated herein by reference.

BACKGROUND

Power over Ethernet (PoE) can also be referred to as Power over LAN (PoL) or Active Ethernet. In a condition that Cat.5 cabling infrastructure for Ethernet is not changed, when data signals are sent for Internet Protocol (IP)-based terminal devices through the PoE, the PoE can simultaneously provide current power for the terminal devices, e.g., IP telephones, wireless local area network Access Points (APs), network cameras and the like. The PoE can ensure normal network operation and structured cabling safety, and can minimize cost.

DETAILED DESCRIPTION OF THE EMBODIMENTS

The technical solutions of embodiments of the present disclosure will be described clearly and fully below in combination with drawings in the embodiments of the present disclosure. It is apparent that the described embodiments are merely a part of embodiments of the present disclosure rather than all embodiments. Other embodiments achieved by those of ordinary skill in the art based on the embodiments in the present disclosure without paying creative work shall all fall into the scope of protection of the present disclosure.

A PoE system includes a Power Sourcing Equipment (PSE), a Power Device (PD) and an Ethernet cable. The PSE transmits electric energy to the PD via the Ethernet cable, and further performs power management and power statistics. The PD obtains the electric energy from the PSE via the Ethernet cable and converts the electric cable into a voltage for its own use.

A PSE is provided in an example of the present disclosure, which can provide electric energy with a high power for the PD via a single Ethernet cable.

Figure 1:
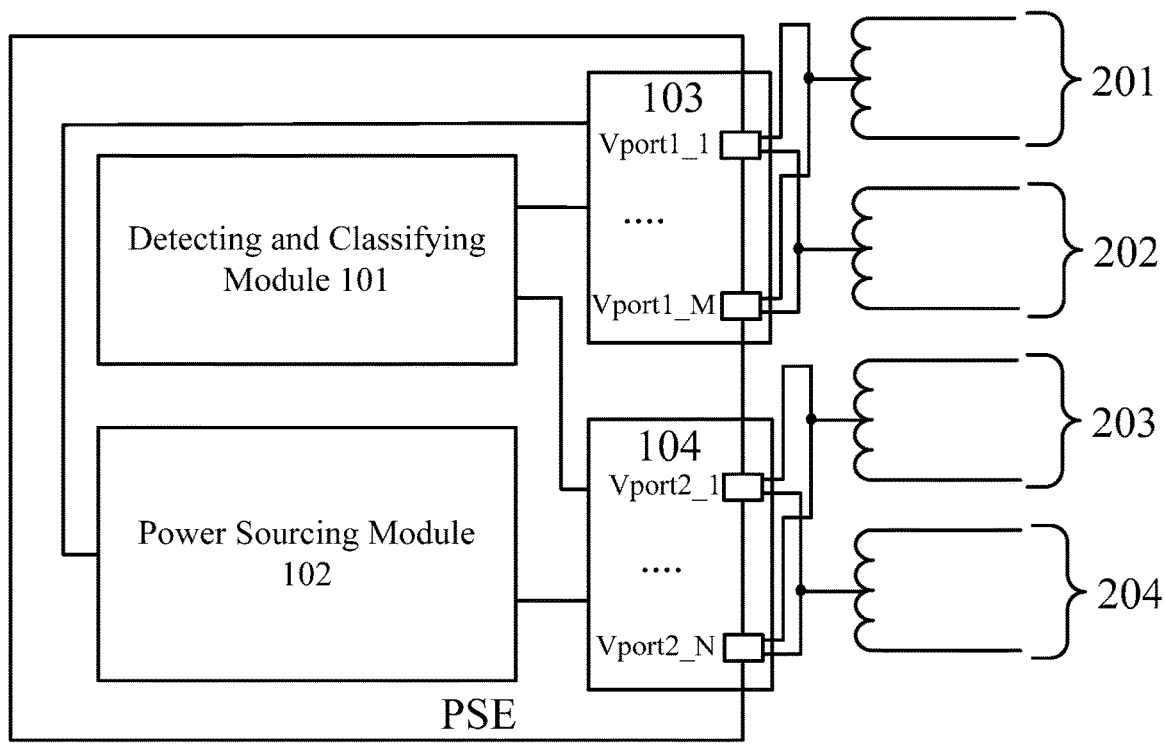
FIG. 1 is a schematic diagram illustrating a structure of a power sourcing equipment (PSE) according to an example of the present disclosure.

In FIG. 1, the PSE includes a detecting and classifying module 101, a power sourcing module 102, and a first port group 103 including a plurality of PSE ports, and a second port group 104 including a plurality of PSE ports.

The first port group 103 includes M PSE ports, which are respectively denoted as Vport1_1, Vport1_2, . . . , Vport1_M, where M≥2. The M PSE ports in the first port group 103 are connected in parallel and connected with a first line pair 201 and a second line pair 202 in the Ethernet cable. In an example, each PSE port has two pins for outputting a positive voltage and a negative voltage, respectively. The M PSE ports may be connected in parallel and connected with the first line pair 201 and the second line pair 202 in the Ethernet cable in the manner as follows. Respective first pins of the M PSE ports are connected in parallel and connected with the first line pair 201 via a transformer. And respective second pins of the M PSE ports are connected in parallel and connected with the second line pair 202 via a transformer.

The second port group 104 includes N PSE ports, which are respectively denoted as Vport2_1, Vport2_2, . . . , Vport2_N, where N≥2. The N PSE ports in the second port group 104 are connected in parallel and connected with a third line pair 203 and a fourth line pair 204 in the Ethernet cable. In an example, each PSE port has two pins for respectively outputting a positive voltage and a negative voltage. The N PSE ports may be connected in parallel and connected with the third line pair 203 and the fourth line pair 204 in the Ethernet cable in the following manner. Respective first pins of the N PSE ports are connected in parallel and connected with the third line pair 203 via a transformer. And respective second pins of the N PSE ports are connected in parallel and connected with the fourth line pair 204 via a transformer.

M and N may be same or different. For example, both M and N are equal to 2. In an example, the first line pair 201 is a line pair including a first line and a second line in the Ethernet cable; the second line pair 202 is a line pair including a third line and a sixth line in the Ethernet cable; the third line pair 203 is a line pair including a fourth line and a fifth line in the Ethernet cable; and the fourth line pair 204 is a line pair including a seventh line and an eighth line in the Ethernet cable. In another example, the first line pair 201 is a line pair including the fourth line and the fifth line in the Ethernet cable; the second line pair 202 is a line pair including the seventh line and the eighth line in the Ethernet cable; the third line pair 203 is a line pair including the first line and the second line in the Ethernet cable; and the fourth line pair 204 is a line pair including the third line and the sixth line in the Ethernet cable, which is not be limited in examples of the present disclosure.

The detecting and classifying module 101 is configured to perform feature detection for the PD connected with the Ethernet cable, During the feature detection process, a low voltage (referred to as a detection voltage for convenient description) of 2 V to 10 V is outputted to detect whether the PD satisfies a related specification before the power is supplied to the PD.

The detecting and classifying module 101 is further configured to perform power classification for the PD when the PD passes the feature detection. When the PD passes the feature detection, an output voltage may be increased to perform the power classification for the PD to determine how much power is desired for the PD, and power adjustment and power allocation are performed. For example, the power is classified as five power classes, i.e., classes 0-4.

The power sourcing module 102 is configured to output an working voltage on the first port group 103 to supply the power to the PD via the first line pair 201 and the second line pair 202 and output the working voltage on the second port group 104 to supply the power to the PD via the third line pair 203 and the fourth line pair 204 when the detecting and classifying module 101 completes the feature detection and the power classification for the PD.

In an example, the power sourcing module 102 outputs a positive voltage (or a negative voltage) from the respective first pins on the M PSE ports in the first port group 103 and a negative voltage (or a positive voltage) from the respective second pins on the M PSE ports in the first port group 103 in a way that the working voltage are respectively outputted to the PD via the first line pair 201 and the second line pair 202. The power sourcing module 102 outputs a positive voltage (or a negative voltage) from the respective first pins on the N PSE ports in the second port group 104 and a negative voltage (or a positive voltage) from the respective second pins on the N PSE ports in the second port group 104 in a way that the working voltage is outputted to the PD via the third line pair 203 and the fourth line pair 204. For example, the working voltage is from 50 V to 57 V.

The PSE may include two port groups. Each of the port groups includes the plurality of PSE ports, and the PSE ports in each of the port groups are connected in parallel to supply power to the PD via two line pairs in the Ethernet cable. In an example, the minimum output power of the single PSE port is 30 Watt (W). The PSE transmits the voltage outputted by at least four PSE ports to the PD via the single Ethernet cable in a way that the minimum power 120 W can be provided for the PD. Further, the number of devices connected with the PD requiring super high power can be greatly increased. For example, the number of super-thin slave devices connected with a super-thin host device in a WLAN can be increased.

To implement the feature detection for the PD, the detecting and classifying module 101 may output a first detection voltage from the first port group, acquire a first current on the first port group, and obtain a first resistance value of the PD according to the acquired first current value, where the range of the first detection voltage may be from 2V to 10V. The detecting and classifying module 101 may output a second detection voltage from the second port group, acquire a second current on the second port group, and obtain a second resistance value of the PD according to the acquired second current value, where the range of the second detection voltage may be from 2V to 10V. When both the first resistance value and the second resistance value are within a predetermined feature resistance range (in which a resistance is an Accept Signature Resistance), it is determined that the PD passes the feature detection, where the feature resistance range is associated with an internal resistance of the PSE ports connected in parallel in the port group.

Each port group includes a plurality of PSE ports, and the internal resistance of the ports is decreased accordingly after the PSE ports are connected in parallel. Thus, it is desired that the resistance value of the PD is increased in a way that a total resistance value in a circuit (a sum of the internal resistance of the PSE ports and the resistance value of the PD) is not changed. In an example, an upper limit value and a lower limit value for the feature resistance range are increased. For example, when each of the first port group and the second group includes two PSE ports, the feature resistance range is calculated to be 37K to 42K ohms.

Further, to satisfy a demand for a super-high power supply, the minimum output power of each PSE port is increased to be 35 W or even higher. In this case, when the PSE transmits the voltage outputted by at least four PSE ports to the PD via the single Ethernet cable, the minimum output power of the PSE can be further increased to be 140 W or above.

In an example, the above PSE can be implemented via a PSE chip. PSE chips with different models may have the different numbers of respective PSE ports. For example, a plurality of PSE chips may have two PSE ports, and a plurality of PSE chips may have four or eight PSE ports. More than two PSE chips may be used to implement the PSE above when the number of PSE ports on each of the more than two PSE chip is less than 4, and one PSE chip may be used when the number of the PSE ports on the PSE chip is no less than 4.

Figure 2:
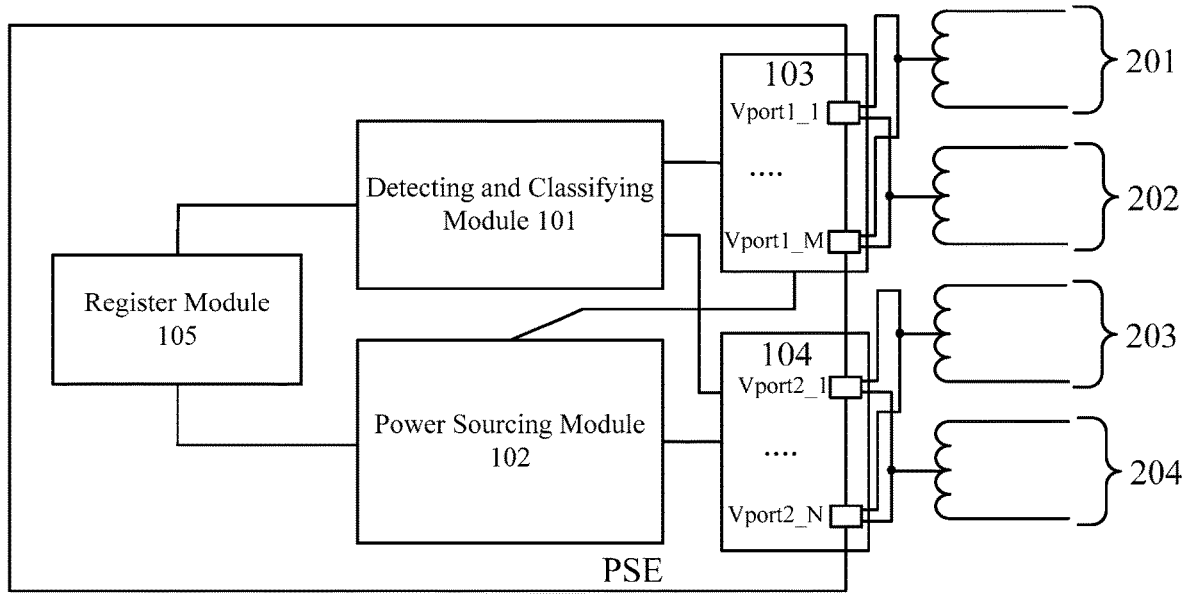
FIG. 2 is a schematic diagram illustrating a structure of a PSE according to an example of the present disclosure.

In an example of FIG. 2, the PSE further includes a register module 105.

The register module 105A stores a preset overload protection power value. Thus, the power sourcing module 102 is further configured to stop outputting the working voltage respectively on the first port group 103 and the second port group 104 when it is detected that the current power of the PD exceeds the overload protection power value stored in the register module 105 in a way that the power of the PD is cut off to protect safety of the PSE.

The register module 105 further stores configuration information associated with the power classification, classes 0 to 5, and the PSE minimum output power corresponding to the class 5 is (M+N)*B W, where M represents the number of the PSE ports in the first port group, N represents the number of the PSE ports in the second port group, and B represents the minimum output power of a PSE port. Thus, the detecting and classifying module 101 is configured to perform the power classification for the PD according to the configuration information associated with the power classification stored in the register module 105.

In an example, the power classes and the PSE minimum output power corresponding to each of the power classes in the example of the present disclosure are illustrated in table 1:

TABLE 1

| | |
|---|---|
| class0 | 15.4 W |
| class1 | 4 W |
| class2 | 7 W |
| class3 | 15.4 W |
| class4 | 30 W |
| class5 | (M + N)*B W |

In table 1, the PSE minimum output power corresponding to the class 5 is (M+N)*B W. For example, the PSE minimum output power corresponding to the class 5 is 120 W when M=2, N=2 and B=30. In an example. When the used PSE chip does not store the class 5 above, the class 5 and the PSE minimum output power corresponding to the class 5 is registered in the PSE chip.

Further, in an example, the detecting and classifying module 101 above does not perform the power classification for the PD. When the PD passes the feature detection performed by the detecting and classifying module 101, the power sourcing module 102 directly supplies the power for the PD. In an example, when the used PSE chip is preset not to perform the power classification for the PD, the configuration information associated with the power classes stored in the register of the PSE chip is cancelled (or set to be disabled). For example, a power threshold value corresponding to each of the classes is cancelled, etc. Further, it is stopped to detect a power class error, or it is stopped to perform warning, e.g., a power classification error is not detected, or the power classification error is not warned.

Figure 3:
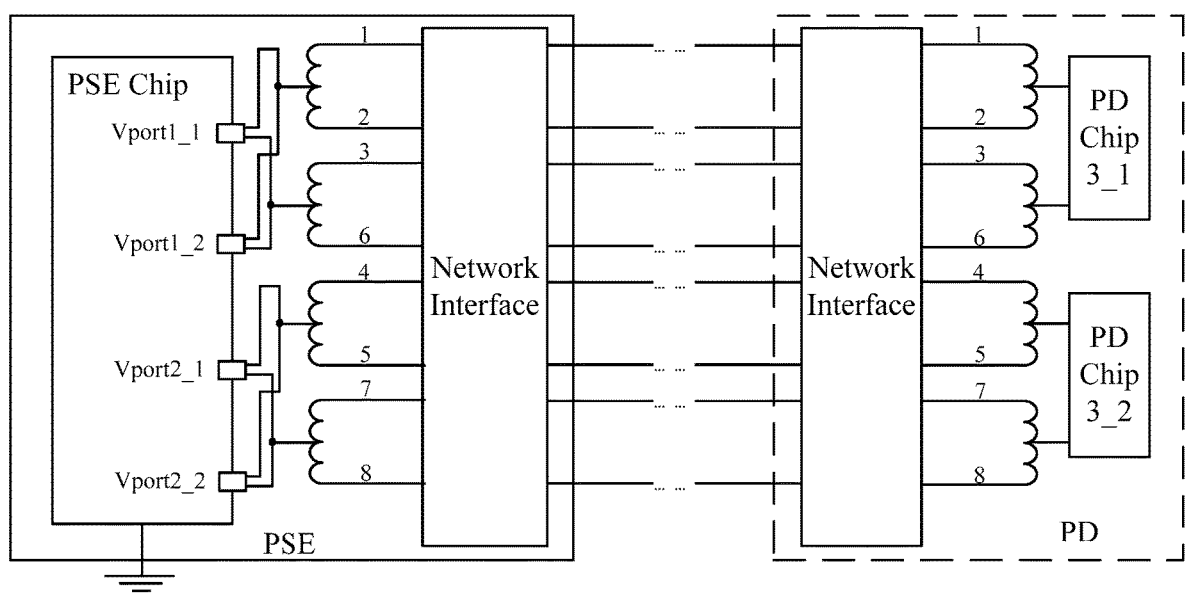
FIG. 3 is a schematic diagram illustrating a structure of a PSE and a PD according to an example of the present disclosure.

In an example below, to describe a power sourcing principle of a PSE, it is assumed that the PSE includes one PSE chip, and the PSE chip has four PSE ports Vport1_1, Vport1_2, Vport2_1 and Vport2_2. In FIG. 3, one pin on the Vport1_1 and one pin on the Vport1_2 are connected in parallel and connected with a pair of a first line and a second line in an Ethernet cable via a transformer, and the other pin on the Vport1_1 and the other pin on the Vport1_2 are connected in parallel and connected with a pair of a third line and a sixth line in the Ethernet cable via a transformer. One pin on the Vport2_1 and one pin on the Vport2_2 are connected in parallel and connected with a pair of a fourth line and a fifth line in the Ethernet cable via a transformer, and the other pin on the Vport2_1 and the other pin on the Vport2_2 are connected in parallel and connected with a pair of a seventh line and an eighth line in the Ethernet cable via a transformer.

A PD connected with the Ethernet cable may include two or more PD chips. In FIG. 3, the PD including two PD chips is taken as an example. In FIG. 3, a PD chip 3_1 is connected with the pair of the first line and the second line as well as the pair of the third line and the sixth line in the Ethernet cable via a transformer, and a PD chip 3_2 is connected with the pair of the fourth line and the fifth line as well as the pair of the seventh line and the eighth line in the Ethernet cable via a transformer. When the PD includes more than three PD chips, more than two chips may be connected in parallel and connected with the pair of the first line and the second line and the pair of the third line and the sixth line, or are connected in parallel and connected with the pair of the fourth line and the fifth line and the pair of the seventh line and the eighth line.

The power supply principle for the PSE in FIG. 3 is described as follows.

The PSE chip outputs a detection voltage on the PSE ports Vport1_1 and Vport1_2 to perform feature detection for the PD chip 3_1 and outputs the detection voltage on the PSE ports Vport2_1 and Vport2_2 to perform the feature detection for the PD chip 3_2.

When the PD chip 3_1 passes the feature detection, the PSE chip performs power classification for the PD chip 3_1. When the PD chip 3_2 passes the feature detection, the PSE chip performs the power classification for the PD chip 3_2.

When completing the power classification for the PD chip 3_1, the PSE chip outputs the working voltage on the PSE ports Vport1_1 and Vport1_2 to supply the power for the PD chip 3_1. When completing the power classification for the PD chip 3_2, the PSE chip outputs the working voltage on the PSE ports Vport2_1 and Vport2_2 to supply the power for the PD chip 3_2.

Alternatively, in the power supply principle above, the PSE chip may perform the feature detection, the power classification and supply the power for the PD chip 3_1, and directly supplies the power for the PD chip 3_2 by using a result of the feature detection and the power classification above.

Since the apparatus embodiments substantially correspond to the method embodiments, a reference may be made to part of the descriptions of the method embodiments for the related part. The apparatus embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . ." shall not be precluded to include additional same elements present in a process, method, article or device including the elements.

The above are detailed description of a method and an apparatus provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A Power Sourcing Equipment (PSE), comprising:
a first port group, comprising a plurality of PSE ports, wherein the PSE ports in the first port group are connected in parallel and connected with a first line pair and a second line pair in an Ethernet cable;
a second port group, comprising a plurality of PSE ports, wherein the PSE ports in the second port group are connected in parallel and connected with a third line pair and a fourth line pair in the Ethernet cable;
a detecting and classifying module, configured to perform feature detection for a Power Device (PD) connected with the Ethernet cable; and
a power sourcing module, configured to output a working voltage from the first port group to supply power for the PD via the first line pair and the second line pair and output the working voltage from the second port group to supply power for the PD via the third line pair and the fourth line pair when the PD passes the feature detection,
wherein the detecting and classifying module is configured to:
output a first detection voltage from the first port group, acquire a first current on the first port group, and obtain a first resistance value of the PD according to the acquired first current value;
output a second detection voltage from the second port group, acquire a second current on the second port group, and obtain a second resistance value of the PD according to the acquired second current value; and
determine that the PD passes the feature detection when both the first resistance value and the second resistance value are within a preset feature resistance range.

2. The PSE according to claim 1, wherein each of the first port group and the second port group comprises two PSE ports.

3. The PSE according to claim 1, wherein the feature resistance range is from 37 K to 42 K ohms.

4. The PSE according to claim 1, wherein each of the PSE ports in the first port group and the PSE ports in the second port has two pins for respectively outputting a positive voltage and a negative voltage;

respective pins outputting the positive voltage on the PSE ports in the first port group are connected in parallel and connected with the first line pair, and respective pins outputting the negative voltage on the PSE ports in the first port group are connected in parallel and connected with the second line pair; and respective pins outputting the positive voltages on the PSE ports in the second port group are connected in parallel and connected with the third line pair, and respective pins outputting the negative voltages on the PSE ports in the second port group are connected in parallel and connected with the fourth line pair.

5. The PSE according to claim 1, wherein minimum output power of each of the PSE ports in the first port group and the PSE ports in the second port group is more than 30 W.

6. The PSE according to claim 1, wherein the PSE further comprises a register module, wherein the register module stores a preset overload protection power value; and the power sourcing module is further configured to stop respectively outputting the working voltage from the first port group and the second port group when it is detected that a current power of the PD exceeds the overload protection power value stored in the register module.

7. The PSE according to claim 1, wherein the detecting and classifying module is further configured to perform power classification for the PD.

8. The PSE according to claim 7, wherein the PSE further comprises a register module, wherein the register module stores configuration information associated with the power classification, wherein the configuration information comprises power classes, classes 0 to 5, and minimum output power of the PSE corresponding to the class 5 is equal to (M+N)*B W, wherein M represents the number of the PSE ports in the first port group, N represents the number of the PSE ports in the second port group, and B represents a minimum output power of a PSE port; and the detecting and classifying module is configured to perform the power classification for the PD according to the configuration information associated with the power classification and stored in the register module.

9. The PSE according to claim 1, wherein the PSE comprises at least one PSE chip.

10. The PSE according to claim 1, wherein the PD comprises two or more PD chips, wherein at least one of the two or more PD chips is connected with the first line pair and the second line pair, and the rest of the two or more PD chips is connected with the third line pair and the fourth line pair.

* * * * *